UNITED STATES PATENT OFFICE.

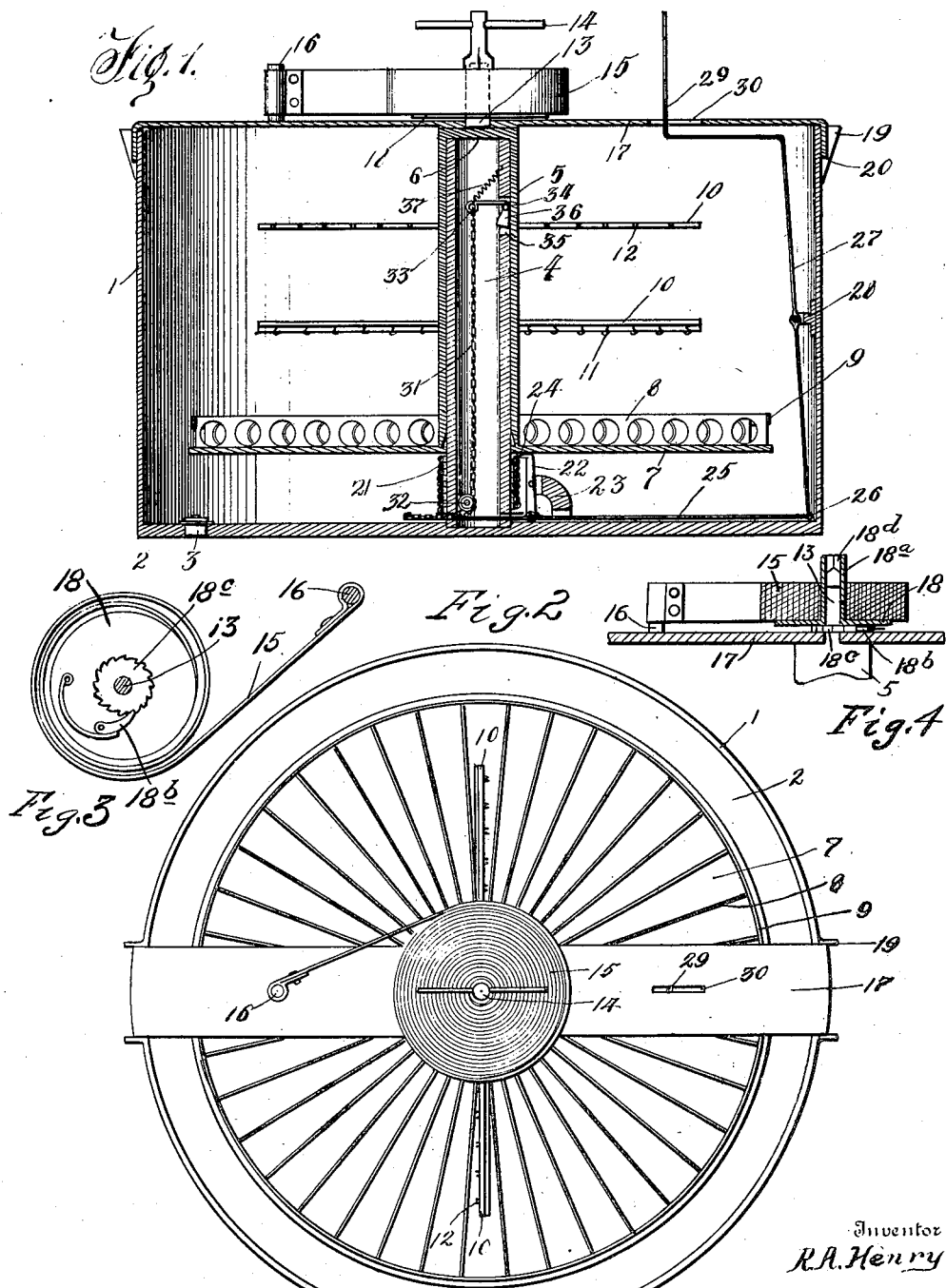

REBECCA A. HENRY, OF IRWIN, PENNSYLVANIA.

DISH-WASHING MACHINE.

944,329.  Specification of Letters Patent.  Patented Dec. 28, 1909.

Application filed March 12, 1909. Serial No. 482,891.

*To all whom it may concern:*

Be it known that I, REBECCA A. HENRY, a citizen of the United States of America, residing at Irwin, in the county of Westmoreland and State of Pennsylvania, have invented certain new and useful Improvements in Dish-Washing Machines, of which the following is a specification, reference being had therein to the accompanying drawing.

This invention relates to a dish washing machine, and the invention has for its primary object to provide a machine wherein novel means are employed for revolving a dish support in a tub, pan or receptacle filled with hot water or a cleansing solution, capable of removing grease, dirt, and foreign matter from dishes placed upon the support.

Another object of this invention is to provide a machine of the above type with a revoluble dish support that can be revolved in a receptacle filled with water, then elevated and revolved above the receptacle to dry the dishes, after having been washed.

A further object of this invention is to provide a simple, durable and easily operated dish washing machine wherein a novel mechanism is employed for revolving dishes in a receptacle and then elevating said dishes to facilitate the removal of the same from the receptacle.

The above objects are attained by a machine that will be hereinafter described in detail and then specifically pointed out in the appended claims, and reference will now be had to the drawings forming part of this application, wherein there is illustrated the preferred embodiments of the invention, but it is to be understood that the details of construction can be varied or changed without departing from the spirit or scope of the invention.

In the drawings, Figure 1 is a vertical sectional view of the machine, Fig. 2 is a plan of the same. Fig. 3 is a longitudinal view of the motor spring, showing a part of the sleeve which carries the arbor for the spring and also showing a part of the spring support in section, and Fig. 4 is a detail plan view of the motor spring and pawl and ratchet mechanism, the arbor and securing pin for one end of the spring being shown in section.

The reference numeral 1 designates a cylindrical receptacle or tub having the bottom thereof provided with a drain opening 2 normally closed by a plug 3. Supported by the bottom of the receptacle is a central vertical tubular post 4 and slidably mounted upon said post, is a sleeve 5 having the upper end thereof closed, as at 6, while the lower end thereof extends into proximity to the bottom of the receptacle 1, and is provided with a circular platform or tray 7. This tray is provided with a plurality of radially disposed apertured bars 8, having the outer ends thereof connected by a rim 9. The tray is adapted to support dishes, as plates and saucers, and for holding cups and similar handled articles in the receptacle, the sleeve 5 is provided with radially disposed arms 10, having hooks 11, and clasps 12, for holding cups and mugs in a suspended position, whereby water can easily drain from the same, when the sleeve 5 is elevated.

The closed upper end of the sleeve 5 carries an arbor 13 and fitting on said arbor is a winding-sleeve $18^a$ which projects beyond the upper end of the arbor and is provided in its upper end with a key-socket $18^d$. This sleeve at its lower end carries a disk 18 provided on its under face with a spring-pressed pawl $18^b$ which engages with a ratchet wheel $18^c$ fixed on the arbor 13 beneath the disk 18. A spring 15 has its inner end attached to the winding-sleeve $18^a$ and its outer end attached to a post 16 carried by a transverse support 17 mounted on the upper open end of the receptacle 1. To hold the support 17 against rotation on the receptacle, the latter is provided on opposite sides thereof at its upper end with lugs 19 which are engaged by depending ends 20 of the support 17.

21 designates a coil spring encircling the lower end of the tubular post 4 between the bottom of the receptacle and the circular tray 7, said spring being employed to elevate the tray and the sleeve 5, after the dishes have been washed. The spring 21 is held under tension by a pawl 22 pivotally supported by a bracket 23 carried by the bottom of the receptacle. The upper end of the pawl is hook shaped, as at 24, to engage the upper convolution of the spring 21, while the lower end of the pawl is pivotally connected to a rod 25 extending through the bracket 23 adjacent to the bottom of the receptacle. One end of the rod 25 is pivotally connected, as at 26, to a lever 27 fulcrumed upon a bracket 28, carried by the inner side of the receptacle 1. The hook-shaped upper end 24 of the pawl 22 is normally held in engagement with the upper convolution of the spring 21 by the lever 27, the normal position of the latter being that shown in Fig. 1. The upper portion 29 of the lever 27 is bent upwardly, and protrudes through a slot 30 provided therefor in the support 17. The opposite end of the rod 25 extends through the base of the tubular post 4 and is connected to a chain or cable 31 extending back into the post, the chain or cable 31 passing over the sheave 32 revolubly supported at the lower end of the post 4. The opposite end of the chain or cable 31 is connected to a brake lever 33 pivotally mounted as at 34, in a slot 35 provided therefor in the post 4. The brake lever 33 is provided with a shoe 36 for frictionally engaging the inner side of the sleeve 5, and said shoe is normally held out of engagement with the sleeve 5 by a coil spring 37, arranged above the brake lever, and connecting the upper end thereof to the post 4.

The receptacle or tub 1, having been filled with water or a cleansing solution, my machine is operated in the following manner,— The dishes to be cleansed are assembled upon the tray 7 and the arms 10, these elements constituting a dish support. The spring 15 is then placed under tension or wound by the key 14 and upon the spring being released, by removing the key 14, said spring gradually unwinds and revolves the sleeve 5, causing the dishes to be thoroughly agitated by the water within the receptacle 1 and cleansed. As the spring 15 unwinds, or expands, the outer convolution thereof contacts with the portion 29 of the lever 27, shifts said lever and the rod 25, to move the pawl 22, releasing the spring 21, and allowing said spring to elevate the sleeve 5, the dish support carried thereby, together with the support 17. Immediately upon the spring 21 being released, the rod 25 pulls upon the chain or cable 31 and causes the brake-shoe 36 to frictionally engage the inner side of the sleeve 5, and prevent too rapid an elevation of said sleeve and the dish support thereof. After the dishes have been elevated, they can be easily removed, or the support 17 held, and the spring 15 can be rewound to revolve the sleeve 5 and dry the dishes carried by the tray 7 and the arms 10. The opening 2 and the plug 3 of the receptacle allows the soiled water to be easily removed.

The machine can be used for sterilizing surgical instruments, and the time of immersion of either instruments or dishes, is regulated by the size of the spring 15 used in connection with the machine.

The brake lever 33 is employed to prevent a sudden movement of the sleeve 5 when the spring 21 is released, and in some instances can be dispensed with.

Having now described my invention, what I claim as new, is;—

1. In a washing machine, the combination with a receptacle, of a central tubular post arranged in said receptacle, a sleeve movably mounted upon said post, a dish support carried by said sleeve, a transverse movable support arranged upon the upper end of said receptacle and adapted to be temporarily held in engagement therewith, an arbor carried by the upper end of said sleeve and extending through the said transverse support, a spiral spring carried by said transverse support and connecting with said sleeve for revolving said sleeve, a coil spring encircling the lower end of said post between said receptacle and said dish support for elevating said sleeve, a pawl pivotally supported within said receptacle for retaining said coil spring under tension, a rod connecting with said pawl, a lever connecting with said rod and extending through said transverse support to be actuated by an unwinding movement of said spiral spring for moving said pawl and releasing said coil spring to elevate said sleeve and the dish support, and means arranged within said tubular post and actuated by said rod for retarding the elevation of said sleeve and the dish support, substantially as described.

2. In a washing machine, the combination with a receptacle, of a central tubular post arranged in said receptacle, a sleeve movably mounted upon said post, a dish support carried by said sleeve, a transverse movable support arranged upon the upper edges of said receptacle and adapted to be temporarily held in engagement therewith, means carried by said support for revolving said sleeve, a coil spring encircling the lower end of said post between said receptacle and said dish support for elevating said sleeve, a pawl pivotally supported within said receptacle for retaining said coil spring under tension, a rod connecting with said pawl and a lever connecting with said rod and extending through said transverse support to be actuated by said sleeve revolving means for moving said pawl and releasing said coil spring to elevate said sleeve and the dish support.

In testimony whereof I affix my signature in the presence of two witnesses.

REBECCA A. HENRY.

Witnesses:
A. H. RABSAG,
JAS. V. MCMASTERS.